Patented May 21, 1935

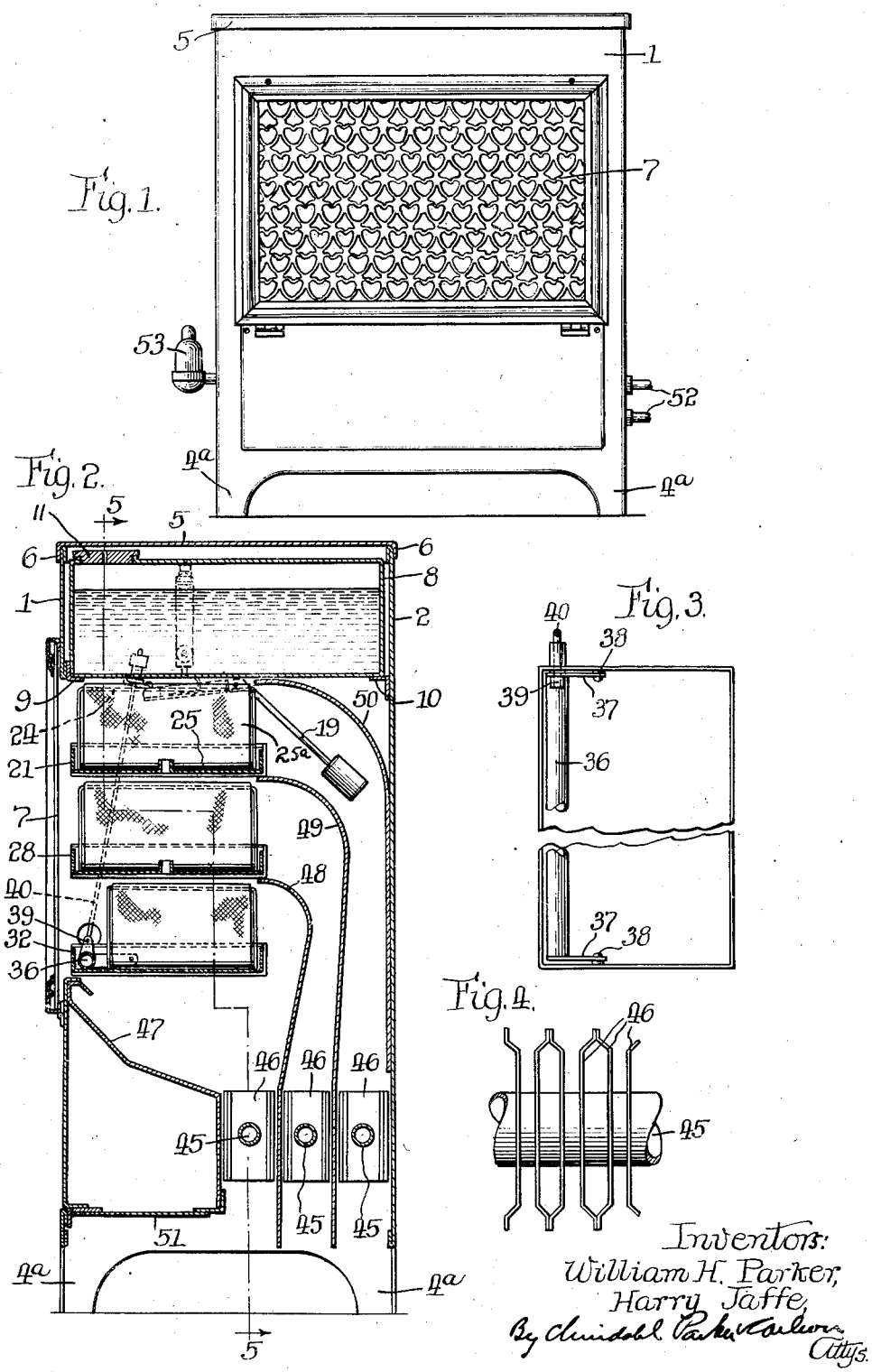

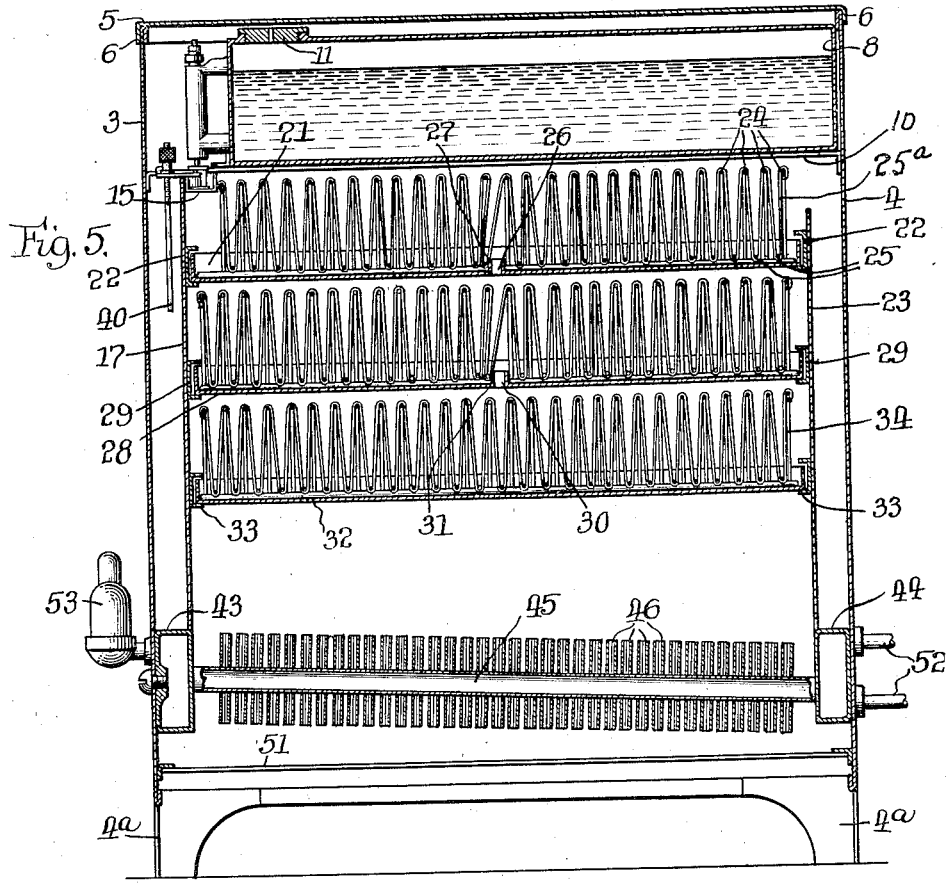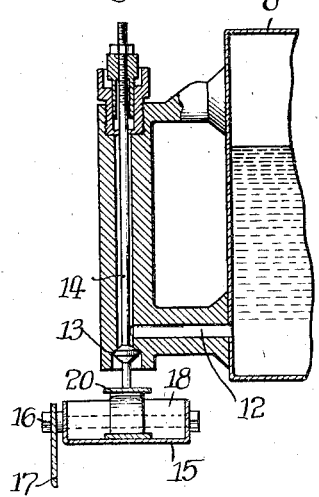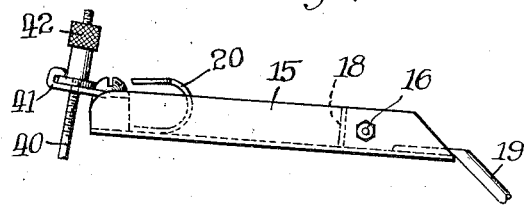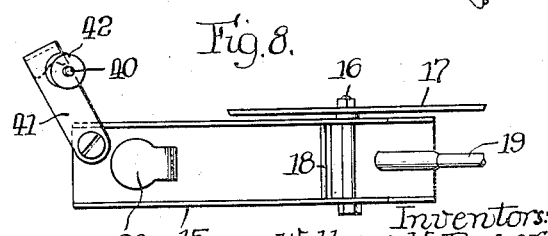

2,002,273

UNITED STATES PATENT OFFICE 2,002,273

HUMIDIFIER

William H. Parker and Harry Jaffe, Chicago, Ill., assignors, by mesne assignments, to Sears, Roebuck and Co.

Application July 5, 1934, Serial No. 733,827

5 Claims. (Cl. 261—104)

This invention relates to means for humidifying the atmosphere of homes, offices, etc., and its object is to provide a simple, inexpensive, compact and efficient apparatus for that purpose.

In the accompanying drawings:

Figure 1 is a front elevation of one form of humidifier embodying the features of our invention.

Fig. 2 is a vertical sectional view of the humidifier.

Fig. 3 is a fragmental plan view of one of the water pans comprised in the apparatus.

Fig. 4 is a fragmental view of one of the air heaters.

Fig. 5 is a vertical sectional view taken in the plane of dotted line 5—5 of Fig. 2.

Fig. 6 is a fragmental sectional view of the water tank.

Fig. 7 is an elevation of the means for conducting water from the tank to a pan therebelow.

Fig. 8 is a plan view of said means.

The embodiment herein shown of the invention comprises a cabinet or casing which may be of any desired size and shape, as, for example, in the form of a rectangular cabinet about two feet high, about twenty inches wide and about eleven inches from front to rear. It will be understood that these dimensions are stated merely by way of illustration and not for the purpose of limiting the invention.

The front wall of the cabinet is indicated at 1, the rear wall at 2 and the end walls at 3 and 4, respectively. The top wall is preferably made removable and therefore may conveniently take the form of a cover 5 adapted to rest upon the upper edges of the walls 1, 2, 3 and 4 and having marginal flanges 6. The cabinet is supported upon feet 4ª.

Within the upper portion of the cabinet is a tank to contain water, said tank having an outlet valve arranged to allow water to flow to a pan located below the tank, said pan containing means to absorb water and expose the same to evaporation over a relatively great surface area. Water overflowing from said tank flows into a lower tank containing a similar arrangement for absorbing water. Water overflowing from the second tank flows to a third tank containing another similar device for absorbing water. The third and lowermost tank contains a float which controls the operation of the outlet valve of the water tank. Below the lowermost tank is a heater which may be connected to any suitable source of supply of heat, as, for example, a conventional radiator such as is used in the heating of homes and offices. Baffles or guides direct a portion of the warm air by convection from the heater to each of the three water-absorbing devices. The humidified air passes out of the cabinet through a grille 7 in the front wall 1. It will, of course, be understood that any desired number of pans and water-absorbing devices may be employed.

The water tank above referred to is indicated at 8. It rests removably upon ledges 9 and 10 secured to the front and rear walls 1 and 2, respectively. In the top wall of the tank is a filling opening normally closed by a screw plug 11. At one end of the tank is an outlet 12 (Fig. 6) arranged to be closed by a valve 13 fixed upon a stem 14, said stem being guided for vertical movement. As hereinbefore stated, this valve is controlled by a float and provision is made to prevent splashing of water as it flows from the valve to the uppermost water pan. In the construction herein shown a trough 15 is mounted within the cabinet to swing upon a pivot 16, said pivot being carried by a partition 17 in the cabinet. The rear wall of the trough 15 is indicated at 18. The front end of the trough is open. A weight 19 attached to the trough 15 rearwardly of the pivot 16 normally holds the trough 15 elevated. In the forward end of the trough 15 is a curved bracket 20 upon which the lower end of the valve stem 14 rests. When the trough 15 is in its normal upper position, the bracket 20 holds the valve stem elevated so as to hold the valve 13 against its seat, thus cutting off the flow of water from the tank 8. When the trough 15 is in the position shown in Fig. 2, water flows past the valve to the bracket 20 and thence to the trough, thus avoiding splashing.

A shallow rectangular pan 21 is supported directly below the water tank 8, the ends of the pan fitting slidably in channels 22 on the partition 17 and a similar partition 23 located within the cabinet. These partitions are parallel with the end walls 3 and 4, respectively.

Within the pan 21 is removably supported a water-absorbing unit which is herein shown as consisting of a wire framework and a strip of absorbent fabric or wicking material. The wire framework comprises a series of upper and lower horizontal bars, the upper bars being indicated at 24 and the lower bars being numbered 25 in the drawings. The fabric 25ª is secured at one end to one of the bars 24 and extends thence to and under the adjacent bar 25 and then up to the next bar 24 and then down to the next bar 25, and so on to the opposite end of the water-absorbing unit. The fabric 25a is thus arranged in a sinuous fashion, the lower portions of the numerous folds being submerged in the water contained in the pan 21. Capillary attraction causes water to rise into the various folds so as to moisten all of the fabric. It will be seen that the water-absorbing unit is highly efficient, yet inexpensive, and that it may be manufactured and sold as a replacement element, if desired.

As shown in Fig. 5, the left-hand end of the pan 21 extends to a point directly below the trough 15 so as to receive water flowing or dripping therefrom. The water-absorbing unit in the pan 21 extends substantially the full length of said pan, save for a shortening to accommodate the trough 15. At a suitable point, as, for example, midway of its length, the pan 21 is provided with an outlet 26 which is surrounded by a tube 27 that is of less height than the walls of the pan 21. When the level of the water in the pan 21 rises above the level determined by the height of the tube 27, water flows through said tube into a pan 28, which is similar to the pan 21 and which contains a water-absorbing unit which is or may be similar to the water-absorbing unit in the pan 21, except that it may be of such length as to occupy the full length of the pan.

The pan 28 is slidably mounted in channels 29 on the partitions 17 and 23. The pan 28 is provided with a drain opening 30 which is surrounded by a tube 31 similar to the tube 27.

Water overflowing from the pan 28 is received in a pan 32 similar to the pan 28, the pan 32 containing a water-absorbing unit 34 which is similar to those in the pans 21 and 28. Channels 33 on the partitions 17 and 23 slidably support the pan 32.

In the lowermost pan is a float formed in this instance of a tube 36 (Figs. 2 and 3) which is closed at its ends, said float being secured to arms 37 which are pivoted at 38 to the end walls of the pan 32. In order to provide room for the float 36 the lowermost water-absorbing unit may be made of a smaller dimension from front to rear than the remaining water-absorbing units. Rigid with the float 36 is an upwardly extending arm 39 which is connected by means of a rod 40 to a bracket 41 which is fixed to the forward end of the trough 15. The upper end of the rod 40 is screw-threaded and extends through a knurled nut 42 which is rotatably connected to the bracket 41, thus providing means whereby the relation of the trough to the float may be adjusted so as to maintain the water level in the lower pan at the desired height.

Below and somewhat to the rear of the tier of water-absorbing devices is a heater which may be of any desired construction, but which is herein shown as comprising two headers 43 and 44 located within the lower portion of the cabinet adjacent to the end walls 3 and 4, respectively, these headers being connected by means of three tubes 45. The tubes 45 are preferably provided with means to expedite the radiation of heat therefrom. Such means may be of any desired character, but are herein shown as comprising sheet-metal fins 46 (Fig. 4) mounted upon said tubes and so constructed as to provide vertical air passages.

In order efficiently to conduct heated air to the water-absorbing units, we provide sheet-metal partitions or baffles 47, 48, 49 and 50 (Fig. 2) extending from the heater to said units. The partition 47 extends from a point below the forward tube 45 and its radiating fins to a point adjacent to and below the lowermost pan 32. The partition 48 extends from between the forward tube 45 and the middle tube 45 to a point below and adjacent to the pan 28. Thus, air heated by the forward tube 45 will be directed to and through the lowermost water-absorbing unit and after evaporating water from said water-absorbing unit will escape through the grille 7. Similarly, the partition 49 extends from between the middle and rear tubes 45 to a point adjacent to and below the uppermost pan 21, the partitions 48 and 49 thereby serving to direct air warmed by the middle tube 45 to and through the middle water-absorbing unit. The partition 50 extends from a point adjacent to the rear tube 45 to a point above and close to the uppermost water-absorbing unit, whereby the partitions 49 and 50 act to direct air warmed by the rear tube 45 to and through the uppermost water-absorbing unit. As shown in Fig. 2, the partitions 48, 49 and 50 extend upwardly in the rear portion of the cabinet and direct the heated air to the rear sides of the water-absorbing units.

A plate 51 extending from the front wall of the cabinet to the lower end of the partition 47 insures that all the air moving upwardly through the cabinet shall flow through the air passages formed by the fins 46. Openings for the admission of air may be provided in any desired way, as by utilizing for that purpose the spaces between the feet 4a.

The upper and lower portions of the header 44 are connected to a convenient source of supply of heating medium, as, for example, an ordinary steam or hot-water radiator by means of tubes 52. To the upper portion of the header 43 is connected a conventional radiator valve 53. As shown in Fig. 5, the tubes 45 are preferably inclined downwardly from the header 43 to the header 44 to facilitate drainage.

It will be seen that we have provided means for efficiently humidifying the air within a room, the construction being such that a relatively large amount of water may be evaporated by a relatively small piece of apparatus, and without the use of a fan. However, it is obvious that a fan may be employed if a forced draft be desired.

When cleaning or replacement of the water-absorbing fabric becomes desirable, the front of the cabinet may be opened by removing the grille 7, thereby giving access to all of the water-absorbing units. Each of the pans 21, 28 and 32 may be withdrawn upon its guide channels and the water-absorbing unit lifted therefrom. It will be understood that prior to withdrawal of the lowermost pan the rod 40 should be disconnected from the arm 39.

While the present embodiment of the invention has been described in considerable detail, it should be noted that the invention is not restricted to such details, except as indicated in the appended claims.

We claim as our invention.

1. A humidifier comprising a cabinet, a water tank in the upper portion of said cabinet, a shallow pan adapted to contain water below the water tank, a water-absorbing unit in said pan, the lower portion of said unit being arranged to extend into the water contained in said pan, an overflow outlet from said pan, a substantially similar pan below the first-mentioned pan and arranged to receive water flowing from said overflow, a water-absorbing unit in the second pan, the lower portion of said unit being arranged to be submerged in water contained in the second pan, a float in the last-mentioned pan arranged to control the flow of water from the water tank, and partitions in the cabinet to direct air to each of said water-absorbing units.

2. A humidifier comprising a cabinet, a water tank in the upper portion of said cabinet, a shallow pan adapted to contain water below the water tank, a water-absorbing unit in said pan, the lower portion of said unit being arranged to extend into the water contained in said pan, an overflow outlet from said pan, a substantially similar pan below the first-mentioned pan and arranged to receive water flowing from said overflow, a water-absorbing unit in the second pan, the lower portion of said unit being arranged to be submerged in water contained in the second pan, and means for supplying warm air to each of said water-absorbing units.

3. A humidifier comprising a water tank, a shallow pan adapted to contain water below the water tank, a water-absorbing unit in said pan, the lower portion of said unit being arranged to extend into the water contained in said pan, a float in the pan arranged to control the flow of water from the water tank, and partitions to direct air to said water-absorbing unit.

4. A humidifier comprising a cabinet, a water tank in the upper portion of said cabinet, a shallow elongated pan adapted to contain water below the water tank, a water-absorbing unit in said pan and occupying substantially its full length, the lower portion of said unit being arranged to extend into the water contained in said pan, an overflow outlet from said pan, a substantially similar pan below the first-mentioned pan and arranged to receive water flowing from said overflow, a similar water-absorbing unit in the second pan, the lower portion of said unit being arranged to be submerged in water contained in the second pan, and partitions extending upwardly within the rear portion of the cabinet to direct air to the rear side of each of said water-absorbing units, the humidified air escaping through the front of the cabinet.

5. A humidifier comprising a cabinet, a water tank in the upper portion of said cabinet, a pan adapted to contain water below the water tank, means for absorbing water from the pan, an overflow outlet from said pan, a pan below the first-mentioned pan and arranged to receive water flowing from said overflow, means for absorbing water from the second pan, and means to direct air to said water-absorbing means.

WILLIAM H. PARKER.
HARRY JAFFE.